United States Patent
Choi et al.

(10) Patent No.: US 9,042,892 B2
(45) Date of Patent: May 26, 2015

(54) EFFECTIVE ENERGY SAVING METHOD OF NEXT GENERATION MOBILE COMMUNICATION

(71) Applicant: Electronics and Telecommunications Research Institute, Daejeon (KR)

(72) Inventors: Sung Gu Choi, Daejeon (KR); Young Jick Bahg, Daejeon (KR); SoonGi Park, Daejeon (KR); Kyung Sook Kim, Daejeon (KR); Hyung-sub Kim, Seoul (KR); Byung-Han Ryu, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 153 days.

(21) Appl. No.: 13/677,724

(22) Filed: Nov. 15, 2012

(65) Prior Publication Data
US 2013/0157642 A1 Jun. 20, 2013

(30) Foreign Application Priority Data
Dec. 15, 2011 (KR) .......................... 10-2011-0135199

(51) Int. Cl.
*H04W 36/00* (2009.01)
*H04W 52/02* (2009.01)

(52) U.S. Cl.
CPC ...... *H04W 52/0206* (2013.01); *H04W 52/0212* (2013.01); *Y02B 60/50* (2013.01)

(58) Field of Classification Search
USPC ............... 455/552.1, 553.1, 426.1, 436–444, 455/41.1–41.3, 432.1–444
See application file for complete search history.

(56) References Cited

U.S. PATENT DOCUMENTS

| 6,377,805 | B1* | 4/2002 | Anvekar et al. ............... 455/436 |
| 2006/0094478 | A1 | 5/2006 | Kim et al. |
| 2009/0016232 | A1* | 1/2009 | Kwon et al. .................. 370/252 |
| 2011/0201378 | A1 | 8/2011 | Lee et al. |
| 2012/0008512 | A1* | 1/2012 | Wahlqvist et al. ............ 370/252 |
| 2012/0196608 | A1* | 8/2012 | Ting et al. ...................... 455/450 |
| 2012/0244869 | A1* | 9/2012 | Song et al. .................... 455/449 |
| 2013/0217389 | A1* | 8/2013 | Punz et al. ................. 455/435.1 |

FOREIGN PATENT DOCUMENTS

| KR | 1020110094825 | 8/2011 |
| KR | 10-1198504 | 11/2012 |

OTHER PUBLICATIONS

Implementing M2M applications via GPRS, EDGE and UMTS by M2M alliance.*
M2M Load Balancing by Chou, dated May 7, 2011.*
Releasing MGID through DSD message by Lin et al., dated Jul. 10, 2011.*

* cited by examiner

*Primary Examiner* — Daniel Lai
(74) *Attorney, Agent, or Firm* — Nelson Mullins Riley & Scarborough LLP; Anthony A. Laurentano, Esq; Lewis Lee, Esq.

(57) ABSTRACT

Disclosed is an operating method of a base station which includes searching user equipment, having a machine to machine (hereinafter, referred to as M2M) communication function, from user equipment under communication; sending an M2M call setup request to the searched user equipment; sending a handover call setup request to the remaining user equipment from among the user equipment under communication; and entering a power-saving mode.

14 Claims, 5 Drawing Sheets

EFFECTIVE ENERGY SAVING METHOD OF NEXT GENERATION MOBILE COMMUNICATION

CROSS-REFERENCE TO RELATED APPLICATIONS

A claim for priority under 35 U.S.C. §119 is made to Korean Patent Application No. 10-2011-0135199 filed Dec. 15, 2011, in the Korean Intellectual Property Office, the entire contents of which are hereby incorporated by reference.

BACKGROUND

The inventive concepts described herein relate to wireless communication, and more particularly, relate to a base station and an operating method of the base station.

A wireless mobile network may provide a seamless wireless communication service to a wireless communication terminal having mobility. The wireless mobile network may be formed of a plurality of base stations.

Each base station may operate one cell. A base station may perform wireless communication with a wireless communication terminal placed within a corresponding cell. When a wireless communication terminal moves from one cell (e.g., a source cell) into another cell (e.g., a target cell), a base station of the target cell may establish communication with a wireless communication terminal, and a base station of the source cell may terminate communication with the wireless communication terminal. This operation may be referred to as a handover (HO). The handover may enable the wireless mobile network to provide a seamless wireless communication service to a wireless communication terminal.

Commercialized wireless mobile networks may include GSM (Global System for Mobile communication), CDMA (Code Division Multiple Access), WCDMA (Wideband CDMA), CDMA 2000, WiMAX (World interoperability for Microwave Access), LTE (Long Term Evolution), and the like.

SUMMARY

Example embodiments of the inventive concept provide an operating method which comprise searching user equipment, having a machine to machine (hereinafter, referred to as M2M) communication function, from user equipment under communication; sending an M2M call setup request to the searched user equipment; sending a handover call setup request to the remaining user equipment from among the user equipment under communication; and entering a power-saving mode.

In example embodiments, the searching, the sending the M2M call setup request, the sending the handover call setup request, and the entering are performed when a cell load is below a critical value.

In example embodiments, the searching comprises sending a search request to an external server; and receiving a search result from the external server.

In example embodiments, the operating method further comprises acquiring information about user equipment, having the M2M communication function, from among the user equipment under communication.

In example embodiments, the searching is performed according to the acquired information.

In example embodiments, the acquiring comprises acquiring information about user equipment, having the M2M communication function and being at a state capable of performing M2M communication, from among the user equipment under communication.

In example embodiments, the searching comprises a searching user equipment, having the M2M communication function and being at a state capable of performing M2M communication, from among the user equipment under communication.

Example embodiments of the inventive concept also provide a base station comprising a communication unit communicating with plural user equipment; a power-saving control database storing information about user equipment, having a machine to machine (hereinafter, referred to as M2M) communication function, from among the plural user equipment; and a processing unit controlling a power-saving mode using the power-saving control database.

In example embodiments, when entering the power-saving mode, the processing unit controls the communication unit to send an M2M call setup request to user equipment registered at the power-saving control database.

In example embodiments, when entering the power-saving mode, the processing unit controls the communication unit to send a handover call setup request to user equipment keeping communication with the communication unit after the M2M call setup request is sent.

In example embodiments, when entering the power-saving mode, the processing unit controls the communication unit to send a handover call setup request to user equipment not registered at the power-saving control database.

In example embodiments, when a cell load is below a critical value, the processing unit controls to enter the power-saving mode.

In example embodiments, when establishing communication with new user equipment, the processing unit controls the communication unit to acquire information about whether the new user equipment has an M2M communication function.

In example embodiments, the power-saving control database stores the information acquired by the communication unit.

In example embodiments, when context release of specific user equipment is performed, the power-saving control database deletes information about the specific user equipment.

In example embodiments, the power-saving control database stores information about user equipment having the M2M communication function and being at a state capable of performing the M2M communication.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
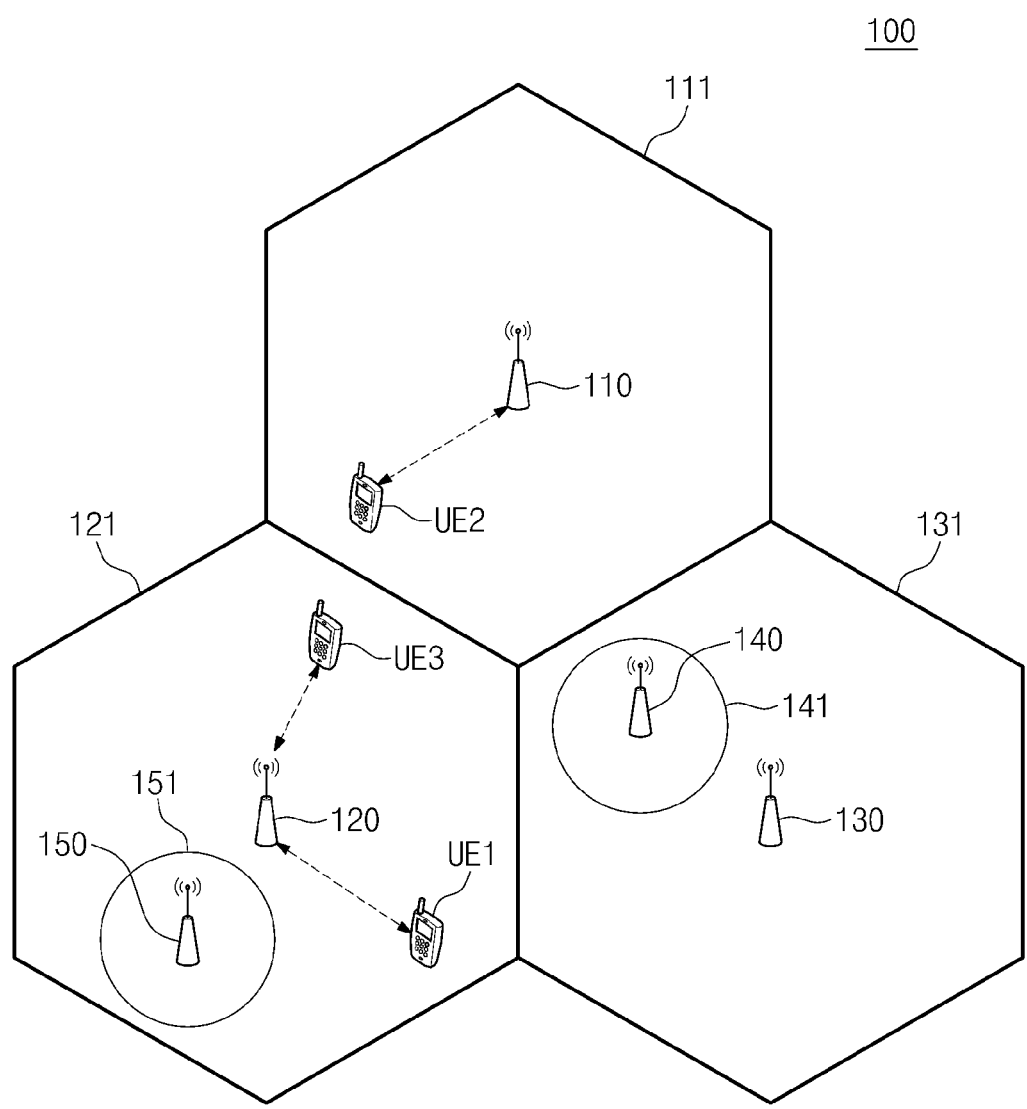
FIG. 1 is a conceptual diagram schematically illustrating a cellular network according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a conceptual diagram schematically illustrating a cellular network according to an embodiment of the inventive concept. Referring to FIG. 1, a cellular network 100 may include base stations 110 to 150. The base stations 110 to 150 may perform wireless communication with user equipment UE1, UE2, and UE3.

The base stations 110, 120, and 130 may form macro cells 111, 121, and 131. The base stations 140 and 150 may form femto cells 141 and 151. A size of each of the base stations 110, 120, and 130 may be larger than that of each of the femto cells 141 and 151.

The macro cells 111, 121, and 131 may form a basic cell structure. The femto cells 141 and 151 may cover a shadow region or a region that the density of the user equipment is high, within the basic cell structure formed by the macro cells 111, 121, and 131. The base stations 110, 120, and 130 forming the macro cells 111, 121, and 131 may be referred to as eNB (evolved Node B). The base stations 140 and 150 forming the femto cells 141 and 151 may be referred to as HeNB (Home evolved Node B).

The base station 120 may acquire and manage a list of user equipment, having an M2M (Machine to Machine) communication function, from among the user equipment UE1 and UE3 located within a cell. For example, when establishing communication with the user equipment UE1 and UE3 entering a cell (e.g., RRC connection reconfiguration), the base station 120 may acquire information about whether or not to have the M2M communication function from the user equipment UE1 and UE3. The base station 120 may periodically check whether the user equipment UE1 and UE3 placed within a cell have the M2M communication function. The base station 120 may control a power-saving mode based on M2M communication information of the user equipment UE1 and UE3.

Likewise, the base stations 110, 130, 140, and 150 may collect M2M communication information of user equipment to control a power-saving mode.

Figure 2:
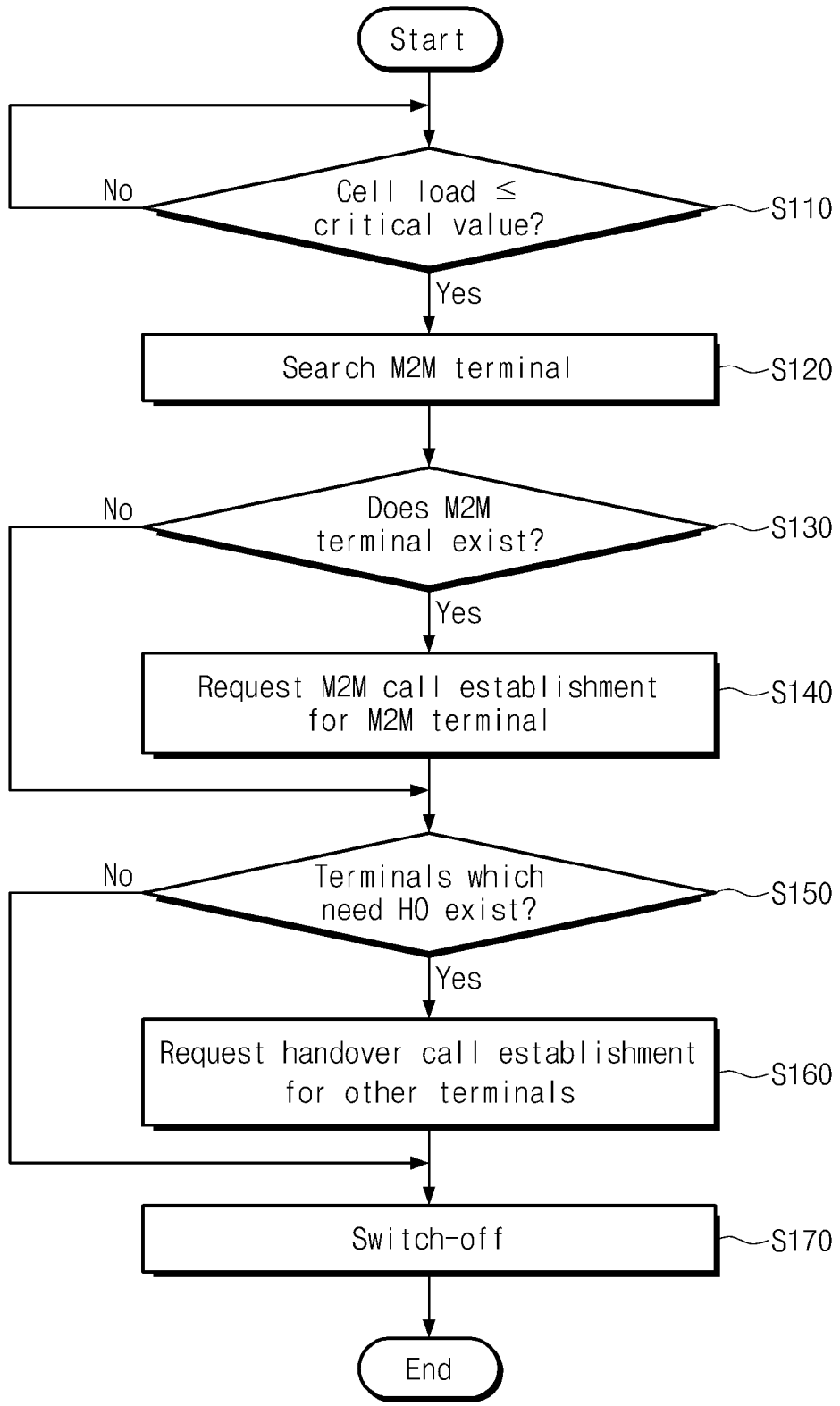
FIG. 2 is a flowchart illustrating an operating method of a base station according to an embodiment of the inventive concept.

FIG. 2 is a flowchart illustrating an operating method of a base station according to an embodiment of the inventive concept. In FIG. 2, there is exemplarily illustrated a power-saving mode controlling method of a base station.

Referring to FIG. 2, in operation S110, a base station may judge whether a cell load is below a critical value. If a cell load is over a critical value, the base station may not enter a power-saving mode. If a cell load is below a critical value, the base station may enter a power-saving mode. The cell load may be determined in the light of the number of occupied user equipment, a wires/wireless resource use amount occupied for a service, a bit error rate (BER) or block error rate (BLER) of transmitted and received data, a strength of transmitted and received signals, a battery level of user equipment, and the like.

In operation S120, the base station may search an M2M terminal. The base station may search user equipment, having an M2M communication function, from among user equipment located within a cell. The base station may search user equipment, having the M2M communication function and capable of performing M2M communication, from among user equipment located within a cell. The base station may keep information about M2M terminals at an internal database, and may search M2M terminals from the internal database. The base station may request and acquire information about the M2M terminals to an external server (e.g., an OAM (Operation, Administration and Maintenance) server).

In operation S130, the base station may judge whether an M2M terminal exists. If so, in operation S140, the base station may send an M2M call setup request to the M2M terminal. The base station may request user equipment, having the M2M communication function and capable of performing M2M communication, to perform M2M communication instead of communication with the base station.

In operation S150, the base station may judge whether the remaining terminal exists. For example, user equipment which has the M2M communication function and is at a state not to perform M2M communication may keep communication with the base station. If the remaining terminal exists, in operation S160, the base station may send a handover call setup request to the remaining terminal. The base station may request the remaining terminal to communicate with a neighboring base station.

For example, the base station may send a handover call setup request to user equipment, not searched at operation S120, from among user equipment under communication. For example, after sending a handover call setup request, the base station can send a handover call setup request to user equipment maintaining communication with the base station.

If operations S130 and S160 are performed, no user equipment communicating with the base station may exist. Afterwards, in operation S170, the base station may be switched off to enter a power-saving mode.

Figure 3:
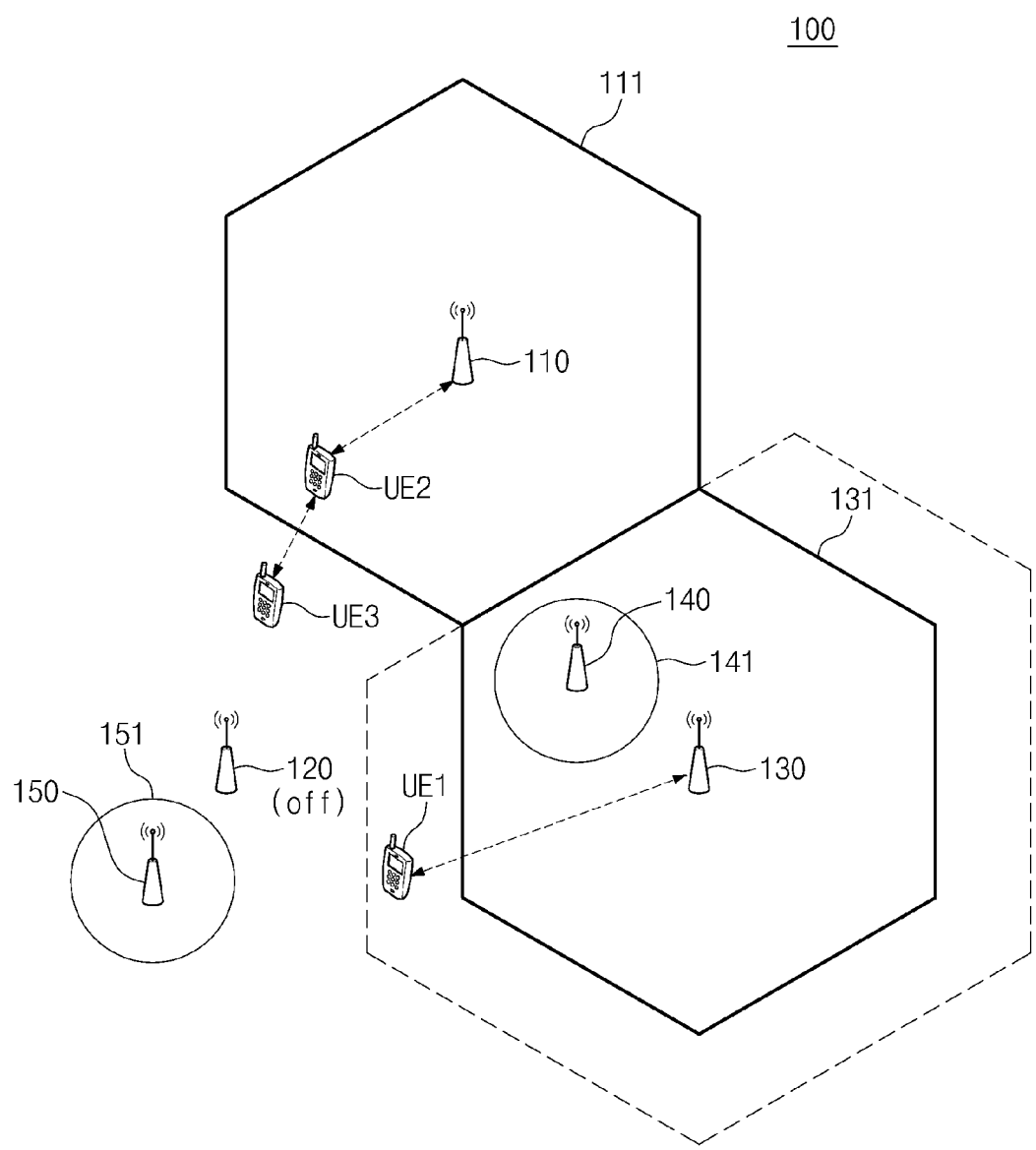
FIG. 3 is a conceptual diagram schematically illustrating an example that a base station enters a power-saving mode at a cellular network.

FIG. 3 is a conceptual diagram schematically illustrating an example that a base station enters a power-saving mode at a cellular network. Compared with FIG. 1, user equipment UE1 may be handed over to communicate with a base station 130. A coverage of the base station 130 may be extended to include user equipment UE1. User equipment UE3 may perform M2M communication with user equipment UE2.

Figure 4:
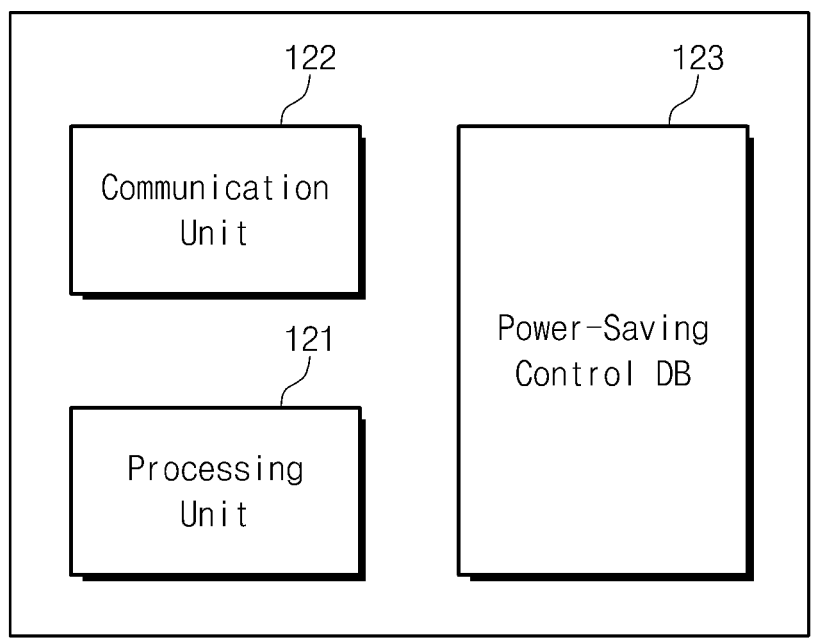
FIG. 4 is a block diagram schematically illustrating a base station according to an embodiment of the inventive concept.

FIG. 4 is a block diagram schematically illustrating a base station according to an embodiment of the inventive concept. In FIG. 4, there is exemplarily illustrated a base station 120. However, other base stations 110, 130, 140, and 150 may be configured the same as illustrated in FIG. 4.

Referring to FIG. 4, a base station 120 may include a processing unit 121, a communication unit 122, and a power-saving control database 123. The processing unit 121 may control an overall operation of the base station 120. The communication unit 122 may communicate with an external device according to the control of the processing unit 121. For example, the communication unit 122 may perform wire or wireless communication with an external server (e.g., an OAM server).

The power-saving control database 123 may store information of user equipment having an M2M communication function from among user equipment placed within a cell.

For example, when new user equipment enters a cell of the base station 120, the base station 120 may establish communication with the new user equipment. At this time, the base station 120 may control the communication unit 122 such that the new user equipment acquires information about information indicating whether or not to have the M2M communication function.

The base station 120 may periodically check whether user equipment placed within a cell has the M2M communication function. The base station 120 may periodically check whether user equipment placed within a cell has the M2M communication function and is at a state capable of performing M2M communication. A result may be stored at the power-saving control database 123.

When the base station 120 enters the power-saving mode, the processing unit 121 may search user equipment from the power-saving control database 123. The communication unit 122 may send an M2M call setup request according to a search result.

When communication between user equipment and the base station 120 is disconnected due to a handover or a power-off, the base station 120 may perform context release of the user equipment. At this time, the power-saving control database 123 may check and delete information about corresponding user equipment.

Figure 5:
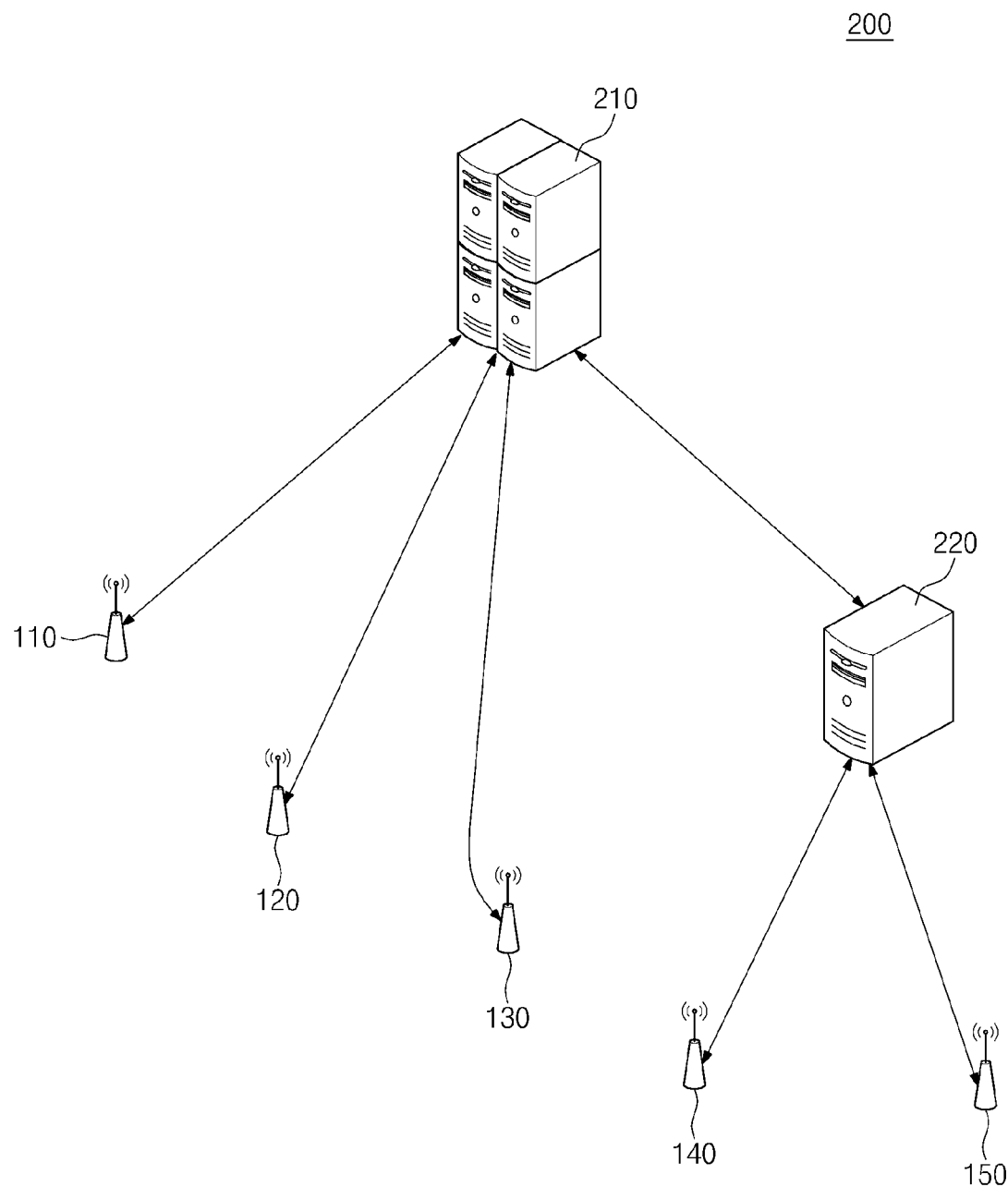
FIG. 5 is a conceptual diagram schematically illustrating a wireless communication network including a cellular network in FIG. 1.

FIG. 5 is a conceptual diagram schematically illustrating a wireless communication network including a cellular network in FIG. 1. Referring to FIGS. 1 and 5, a wireless communication network 200 may include an OAM server 210, a gateway 220, and base stations 110 to 150. For ease of illustration, cells 111 to 151 in FIG. 1 may not be illustrated in FIG. 5.

The OAM server 210 may be configured to control the wireless communication network 200 and wireless communication between the wireless communication network 200 and user equipment UE1, UE2, and UE3.

Base stations 110 to 130 forming macro cells may be directly connected with the OAM server 210. The base stations 110 to 130 may perform wireless communication with the user equipment UE1, UE2, and UE3 under the control of the OAM server 210.

Base stations 140 and 150 forming femto cells may be connected to the gateway 220. The base stations 140 and 150 may be controlled by the OAM server 210 through the gateway 220. The base stations 140 and 150 may perform wireless communication with the user equipment UE1, UE2, and UE3 under the control of the OAM server 210.

The OAM server 210 may store information about user equipment, having an M2M communication function, from among user equipment located at cells of the base stations 110 to 150. The OAM server 210 may store information about user equipment, having an M2M communication function and being at a state capable of performing M2M communication, from among user equipment located at cells of the base stations 110 to 150. The base station 120 may not include a power-saving control database 214 (refer to FIG. 4), and may send a search request on user equipment to the OAM server 210. The base station 120 may receive a search result from the OAM server 210 to send an M2M call setup request.

With embodiments of the inventive concept, when a base station enters a power-saving mode, an M2M call setup request may be sent to user equipment having an M2M (Machine to Machine) communication function, and a handover call setup request may be sent to the remaining user equipment. That is, when a base station enters a power-saving mode, user equipment may continue to keep communication through M2M communication and handover. Since a communication load is distributed by M2M communication and handover, overload of handover traffic may be prevented. Thus, a critical value where a base station enters a power-saving mode may increase, and a power-saving effect of the base station may be improved. Further, since power consumption at M2M communication is less than that base station communication, the whole power consumption of a wireless communication network 200 may be reduced.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. An operating method of a base station, the method comprising:
    searching user equipment that is capable of machine to machine (M2M) communication function, among user equipments under communication with the base station;
    sending an M2M call setup request to the searched M2M-capable user equipment;
    sending a handover call setup request to remaining user equipment under communication with the base station; and
    entering a power-saving mode,
    wherein the M2M call setup request requests the M2M-capable user equipment to perform M2M communication with another user equipment in order to connect to another base station through the another user equipment that is connected to the another base station, and
    wherein the handover call setup request requests the remaining user equipment to perform a handover.

2. The operating method of claim 1, wherein the searching, the sending the M2M call setup request, the sending the handover call setup request, and the entering are performed when a cell load is below a critical value.

3. The operating method of claim 1, wherein the searching comprises:
    sending a search request to an external server; and
    receiving a search result from the external server.

4. The operating method of claim 1, further comprising:
    acquiring information about user equipment, having the M2M communication function, from among the user equipment under communication.

5. The operating method of claim 4, wherein the searching is performed according to the acquired information.

6. The operating method of claim 4, wherein the acquiring comprises acquiring information about user equipment, having the M2M communication function and being at a state capable of performing M2M communication, from among the user equipment under communication.

7. The operating method of claim 6, wherein the searching comprises searching user equipment, having the M2M communication function and being at a state capable of performing M2M communication, from among the user equipment under communication.

8. A base station comprising:
    a communication unit communicating with plural user equipments;
    a power-saving control database storing information about user equipment that is capable of machine to machine (M2M) communication function, from among the plural user equipments; and
    a processing unit controlling a power-saving mode using the power-saving control database,
    wherein when entering the power-saving mode, the processing unit controls the communication unit to send an M2M call setup request to the M2M-capable user equipment registered at the power-saving control database, the M2M call setup request requesting the M2M-capable user equipment to perform M2M communication with another user equipment in order to connect to another base station through the another user equipment that is connected to the another base station,
    wherein when entering the power-saving mode, the processing unit controls the communication unit to send a handover call setup request to remaining user equipment keeping communication with the communication unit after the M2M call setup request is sent, the handover call setup request requesting the remaining user equipment to perform a handover.

9. The base station of claim 8, wherein when entering the power-saving mode, the processing unit controls the communication unit to send a handover call setup request to user equipment not registered at the power-saving control database.

10. The base station of claim 8, wherein when a cell load is below a critical value, the processing unit controls to enter the power-saving mode.

11. The base station of claim 8, wherein when establishing communication with new user equipment, the processing unit controls the communication unit to acquire information about whether the new user equipment has an M2M communication function.

12. The base station of claim 11, wherein the power-saving control database stores the information acquired by the communication unit.

13. The base station of claim 8, wherein when context release of specific user equipment is performed, the power-saving control database deletes information about the specific user equipment.

14. The base station of claim 8, wherein the power-saving control database stores information about user equipment having the M2M communication function and being at a state capable of performing the M2M communication.

* * * * *